United States Patent [19]
Barényi

[11] 3,891,258
[45] June 24, 1975

[54] BUMPER FOR MOTOR VEHICLES

[75] Inventor: Béla Barényi, Maichingen, Germany

[73] Assignee: Daimler-Benz Aktiengesellschaft, Germany

[22] Filed: Feb. 17, 1972

[21] Appl. No.: 227,491

[30] Foreign Application Priority Data
Feb. 18, 1971   Germany............................ 2107701

[52] U.S. Cl................................. 293/98; 293/71 R
[51] Int. Cl. ............................................. B60r 19/08
[58] Field of Search .............. 93/71 R, 71 P, 97, 98

[56] References Cited
UNITED STATES PATENTS

| | | | |
|---|---|---|---|
| 1,513,256 | 10/1924 | McGowen | 293/97 |
| 1,636,965 | 7/1927 | McGowen | 293/97 |
| 1,753,411 | 4/1930 | Gunn | 293/71 R |
| 2,531,967 | 11/1950 | Bishop | 293/71 R |
| 3,290,082 | 12/1966 | Fritsch | 293/71 R |
| 3,427,063 | 2/1969 | Taylor | 293/71 R |

FOREIGN PATENTS OR APPLICATIONS 1,430,870   1/1969   Germany.......................... 293/71 R Primary Examiner—James B. Marbert
Assistant Examiner—Robert Saifer
Attorney, Agent, or Firm—Craig & Antonelli

[57] ABSTRACT

A bumper for motor vehicles, especially passenger motor vehicles, which is arranged in front of or to the rear of the frame-like support structure and whose center part possesses at least one hollow profile that is delimited on both sides by lateral parts; the hollow profile is provided with outwardly projecting webs that are constructed as connections or mounts for mounting supports and/or one or several elastic profiles.

37 Claims, 15 Drawing Figures

PATENTED JUN 24 1975 3,891,258

SHEET 1

FIG.12
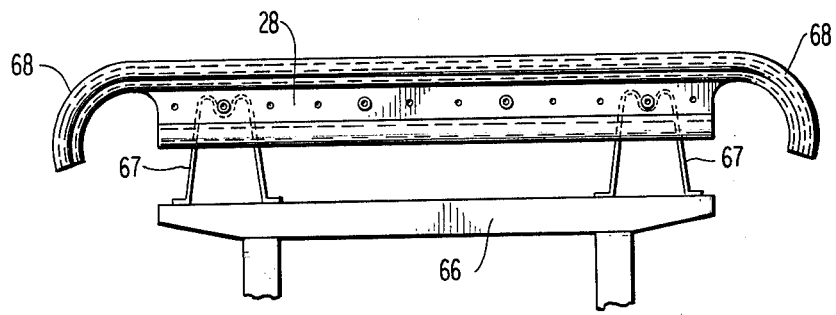
FIG.13
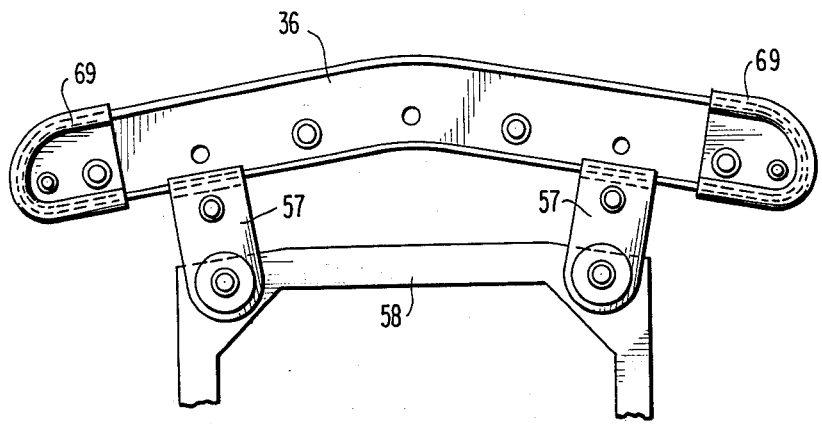
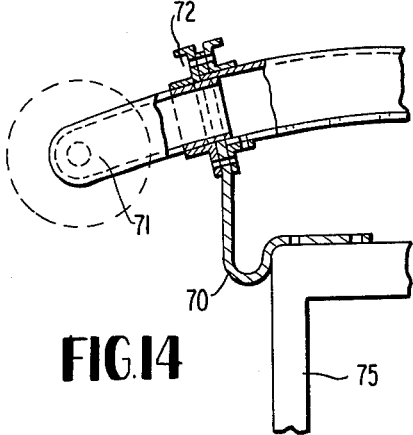
FIG.14
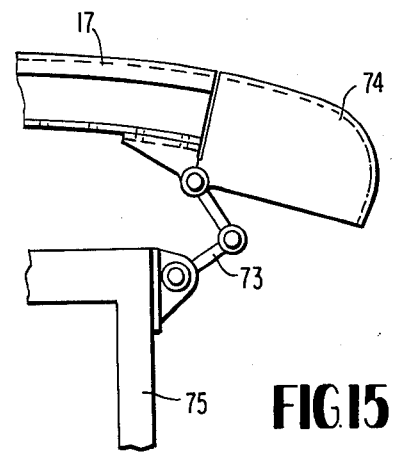
FIG.15

BUMPER FOR MOTOR VEHICLES

The present invention relates to a bumper for motor vehicles, especially for passenger motor vehicles, which is arranged transversely in front of or to the rear of the support structure and whose center section includes at least one hollow profile or sectional member which is delimited on both sides by lateral parts.

The bumpers presently used in practice which are quite costly in manufacture, entail difficulties as regards the accommodation or connections for mounting means, protective profiles and accessories or the like.

The present invention is concerned with the task to provide a form-rigid, simple and inexpensive bumper of the aforementioned type which permits its assembly and also a subsequent assembly of other parts easily, inexpensively and at any desired location. The present invention essentially consists in that the hollow profile is provided with outwardly projecting webs which are constructed as connections or mounts for mounting supports and/or one or several elastic protective profiles. Such a hollow profile which is characterized by a particular rigidity, can be secured at the support structure, such as the vehicle frame, chassis-frame or the like, in a simple manner whereby its webs can support additionally mounting means for license tags, lights or the like.

In order to increase considerably the rigidity, it is of advantage if the hollow profile consists of at least two chambers which are connected with each other by one or several webs.

In order to be able to mount the supports for the fastening at the support structure or for lamps or the like in a simple manner, the hollow profile, according to a further feature of the present invention, is provided with apertured rows preferably in the webs. Particularly advantageous embodiments of the present invention are obtained if the hollow profile consists of an extrusion member. Such an extrusion profile can be manufactured in any desired profile or sectional configuration with slight cost involvements. In order to be able to adapt the rigidity of the bumper to the requirements in a simple manner, in an advantageous embodiment of the present invention several hollow profiles or sectional members are arranged one above the other.

In a simple embodiment of the present invention the ends of the center part are provided with a cross-sectional reduction and are bent off inwardly.

In a further embodiment of the present invention, provision is made that elastically yielding or plastically deformable lateral parts project forwardly and/or laterally from the corners of the hollow profile. Such lateral parts, which are constructed as separate and easily detachable structural parts, can be exchanged in a simple manner in case of damage without resulting in excessive repair costs. In an advantageous embodiment of the present invention, the lateral parts are constructed as shells. In another embodiment of the present invention, hollow bodies extending in the vehicle longitudinal direction serve as lateral parts. In a ost simple embodiment, the hollow profile or profiles are closed off laterally by plugs or caps of preferably elastic material.

Provision is made in another embodiment of the present invention that the center part is held between jaw-like mounting supports. It is thereby particularly advantageous if each mounting support includes two jaw-like lugs which have a vertical spacing within the area behind the center part that is larger than the height of the center part. In this embodiment a deformation path is created in a simple manner, by which the bumper can displace itself in case of a strong impact. The special construction of the mounting means permits that the mounting supports can fold-in between the hollow profile or profiles without requiring a free space on the side of the vehicle.

In another embodiment in accordance with the present invention, provision is made that several hollow profiles arranged one above the other of the center section are secured by means of a common bolt at a mounting support which in its height is smaller than the vertical distance between the hollow profiles. Also in this embodiment a deformation is made possible within the area of the mounting support.

In a further embodiment of the present invention, provision is made that the protective profile or profiles engage from above or from below into webs of the hollow profile which are approximately vertical on the front side of the hollow profile and possibly are angularly bent off. In an advantageous embodiment of the present invention, two protective profiles of elastic material are mounted within the area of the upper and lower edge of the hollow profile, which project forwardly preferably by different distances.

In a particularly advantageous embodiment of the present invention, provision is made that a profile serving as deformation element and/or support member is embedded in or inserted into the protective profile. Preferably a closed metal profile is utilized for that purpose.

In still a further embodiment the upper and the lower protective profile are constructed as separate structural parts and are connected by a spacer element. It is thereby appropriate if the spacer elements are constructed as decorative parts, preferably from non-corrosive material.

Accordingly, it is an object of the present invention to provide a bumper for motor vehicles which avoids by simple means the aforementioned shortcomings and drawbacks encountered in the prior art.

Another object of the present invention resides in a bumper for motor vehicles, especially passenger motor vehicles, which can be manufactured in a relatively simple and inexpensive manner.

A further object of the present invention resides in a bumper for motor vehicles which offers great versatility as regards mounting and/or accommodation of protective profiles, accessory parts, mounting means for other parts, etc.

Still another object of the present invention resides in a bumper which is not only characterized by particular rigidity but can be readily secured at a vehicle frame-like support structure.

Another object of the present invention resides in a bumper which can be readily adapted in its rigidity to the requirements expected thereof.

These and other objects, features and advantages of the present invention will become more apparent from the following description when taken in connection with the accompanying drawing which shows, for purposes of illustration only, several embodiments in accordance with the present invention, and wherein:

FIG. 12-15 are plan views of further embodiments of bumpers in accordance with the present invention.

Figure 1:
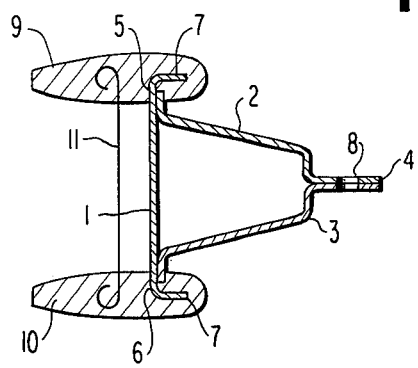
FIG. 1 is a cross-sectional view through a first embodiment of a bumper in accordance with the present invention.

Referring now to the drawing wherein like reference numerals are used throughout the various views to designate like parts, the most essential component of the bumper according to the present invention is a center part which consists of one or several hollow profiles or sectional members. FIG. 1 illustrates an embodiment of the present invention in which the hollow profile or sectional member, whose cross section tapers rearwardly in a trapezoidal shape, is assembled from three plate or sheet metal members 1, 2 and 3 which are connected with each other by spot welding. The two sheet metal parts 2 and 3 are constructed symmetrically to the center plane and abut against one another by means of two flanges which form a web 4 projecting horizontally toward the rear from the hollow profile. The forward sheet metal member 1 possesses a U-shaped configuration open toward the rear, whereby its web is disposed vertically. The two sheet metal members 2 and 3 abut at this sheet metal member 1 by means of flanges on the former bent toward the outside, whereby two further webs 5 and 6 are produced which are disposed within the area of the forward edge and project upwardly and downwardly, respectively. The free edges 7 of the webs 5 and 6 are angularly bent off toward the rear. The horizontal web 4 is provided with a row of apertures 8. The direct fastening of the entire bumper takes place at the web 4 in a conventional manner (not shown) on the support structure of a motor vehicle, again of conventional construction, and more particularly at any desired spacing in width. Additionally, the apertured row 8 of the web 4 may be utilized for the mounting of support means, for example, for the mounting of support means for lights of license tags or the like. Protective profiles 9 of any suitable known material are placed over the two forward webs 5 and 6, which extend forwardly from the front side of the hollow profile. A spacer element 11 is provided between the two protective profiles 9 and 10 which engages in the protective profiles 9 and 10 in a similar manner as the webs 5 and 6 engage therein with their edges 7. The spacer element 11 is appropriately made of a thin noncorrosive material, for example, of a thin sheet metal element or of synthetic plastic material, such as for example, synthetic resinous material. The spacer element 11 may be provided as continuous structural part or may be arranged at regular intervals or spacings. It is possible to write on or print on the spacer element 11 and to construct the same in this manner as license tag. Additionally, it may be provided with a reflecting surface or may even consist of self-reflecting or also of transparent material.

Figure 2:
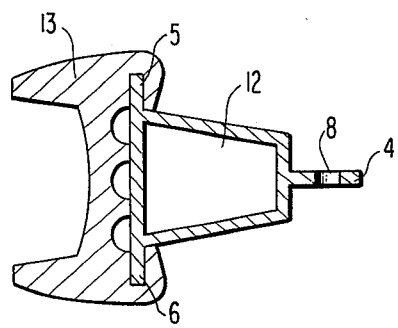
FIGS. 2 to 7 are cross-sectional views through further embodiments of bumpers in accordance with the present invention.

The hollow profile 12 illustrated in FIG. 2 corresponds in its cross section approximately to the hollow profile illustrated in FIG. 1. However, like the remaining hollow profiles illustrated in FIGS. 3 to 7, it is constructed as extrusion member. It includes on its backside a horizontal web 4 provided with a row of apertures 8 and within the area of its vertical front surface with two vertical webs 5 and 6. A protective profile 13 covering the front surface is fastened over the webs 5 and 6 in any conventional manner, for example, by being snapped in by clips or the like; the protective profile 13 includes on its front side a groove-shaped or channel-shaped recess.

Figure 3:
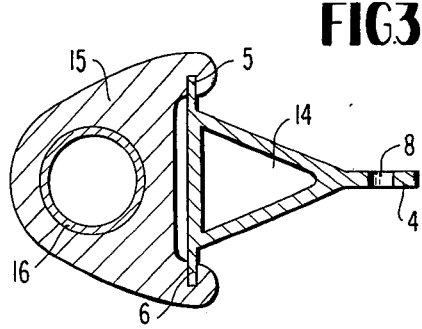

The hollow profile 14 illustrated in FIG. 3 corresponds essentially to the embodiment according to FIG. 2 with the difference that its cross section tapers rearwardly in triangular shape. A protective profile 15 of elastic material, for example, of rubber is again mounted in any conventional manner on the two webs 5 and 6 projecting upwardly and downwardly within the area of its front wall; a tubular member 16 is inserted into the protective profile 15 which acts as support member and/or deformation element. The tubular member 16 is completely surrounded by the protective profile 15.

Figure 4:
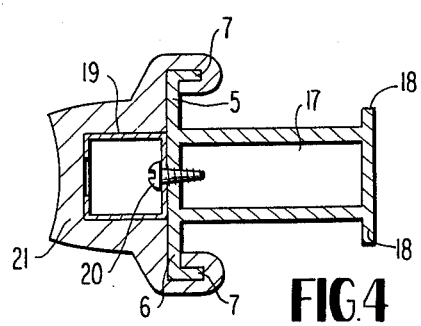

The hollow profile illustrated in FIG. 4 possesses a rectangular cross section whose largest dimension is disposed approximately in the horizontal direction. It is provided within the area of its front wall with vertical webs 5 and 6 whose edges 7 are angularly bent off toward the rear. The hollow profile 17 is provided within the area of its backside with two upwardly directed webs 18 which serve as connections for mounting means of the support structure or of additional aggregates. A square tubular member 19 provided with local bores is secured by means of screws 20 at the front wall of the hollow profile 17. The webs 5 and 6 and the rectangular tubular member 19 are surrounded by a protective profile 21 which is clamped or adhesively fastened to the angularly bent edges 7 of the webs 5 and 6.

Figure 5:
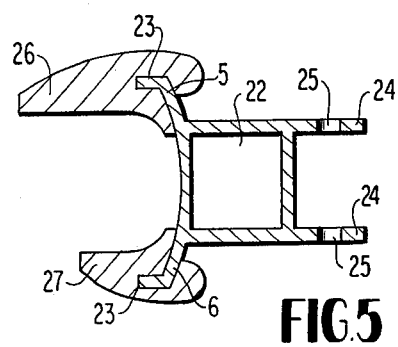

The hollow profile 22 according to FIG. 5 has a square hollow chamber. Its front wall is concavely curved as viewed from in front thereof. Webs 5 and 6 extend within the area of the concavely curved front wall with the same curvature as the front wall in the upward and downward direction. The edges 23 of the webs 5 and 6 are thereby angularly bent off in the forward direction. The hollow profile 22 is provided with horizontal webs 24 in extension of the upper and lower walls thereof; the webs 24 thereby extend parallel to one another. Both webs 24 are provided with apertured rows disposed co-axially one above the other, of which one bore 25 each can be seen in the drawing. Two strip-like protective profiles 26 and 27 are mounted on or adhesively fastened to the webs 5 and 6. The profile 26 thereby projects further forwardly than the profile 27.

Figure 6:
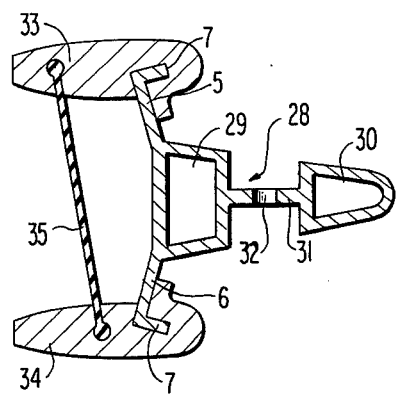

In the embodiment according to FIG. 6, a hollow profile generally designated by reference numeral 28 is provided which includes two hollow chambers 29 and 30 that are connected with each other by a horizontal web 31. The chamber 29 tapers trapezoidally shaped toward the rear and the chamber 30 is approximately triangularly shaped whereas its rear end closes off with a rounded off portion. The horizontal web 31 is provided with a row of apertures of which a bore 32 can be seen. Slightly forwardly inclined webs 5 and 6 adjoin the front wall of the chamber 29 in the upward and downward direction, whose edges 7 are bent off toward the rear. Protective profiles 33 and 34 are mounted on or bonded to the webs 5 and 6 which are additionally connected with each other in front of the front wall of the hollow profile 28 by an inserted spacer element 35 of synthetic resinous material; the spacer element 35 is thereby arranged with an inclination toward the front as shown. This spacer element 35 may additionally serve in part or in its entirety as license tag, possibly with reflecting surfaces; however, it may also protect against dirt and damages in case of its transparent construction the license tag arranged therebehind or also lights, reflectors, signal horns or similar installations.

Figure 7:
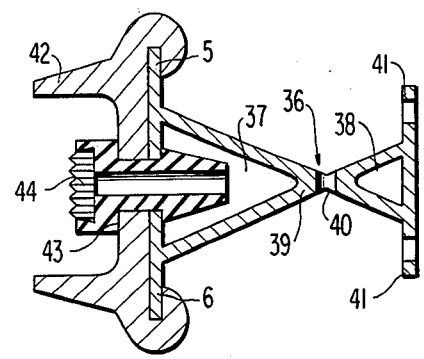

FIG. 7 illustrates a further hollow profile generally designated by reference numeral 36 which includes two chambers 37 and 38 arranged one behind the other. The chambers 37 and 38 possess each a triangular cross section and are directed against one another with the apexes thereof. The web 39 remaining between the same is provided with a row of apertures of which a bore 40 can be seen. The rear wall of the rear chamber 38 is provided with upwardly and downwardly directed webs 41 which are provided with rows of apertures. Vertical webs 5 and 6 project from the front wall of the forward chamber 37 in the upward and downward direction, which serve for the mounting of a protective profile 42 of elastic material. The forward wall of the chamber 37 is possibly also provided with a row of apertures into which reflectors 44 surrounded by elastic two-purpose-clips 43 are mounted in the illustrated embodiment. The protective profile 42 is provided with projections protruding beyond the reflectors 44.

Figure 8:
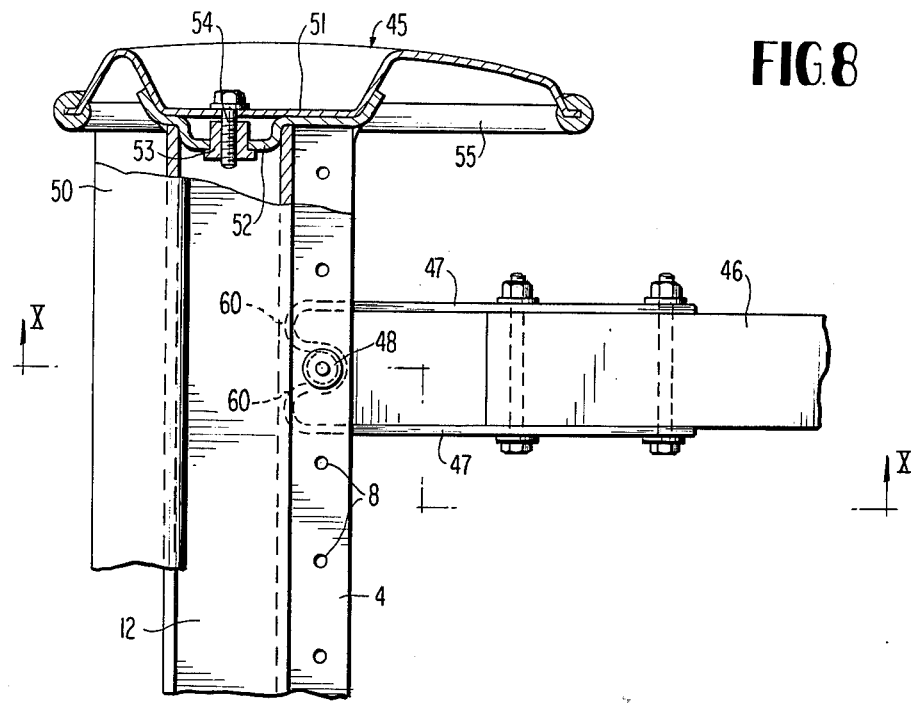
FIG. 8 is a plan view, partially in cross section, on one half of a symmetrically constructed bumper in accordance with the present invention.
Figure 10:
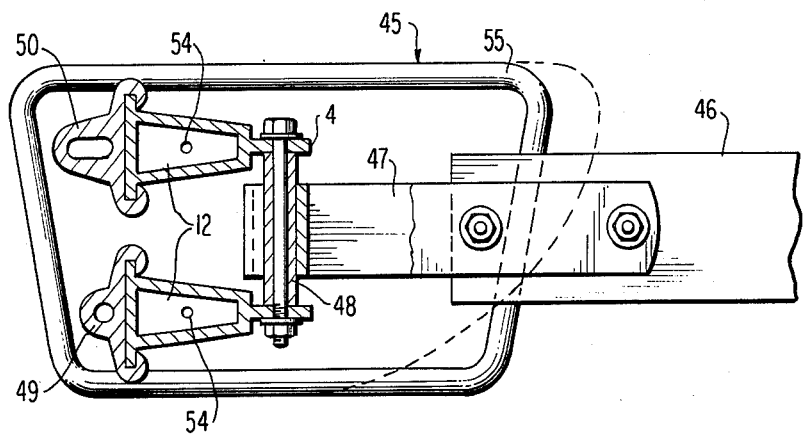
FIG. 10 is a cross-sectional view taken along line X-X of FIG. 8.

FIG. 8 illustrates in plan view how a bumper constructed of two hollow profiles 12 corresponding to FIG. 2 and lateral parts generally designated by reference numeral 45 adjoining the same are secured at the support structure 46, for example, a frame structure of a motor vehicle. A mounting support which consists of two jaw-like mounting brackets or lugs 47 is threadably secured at the support structure 46. A rearwardly retracted connecting web is provided between the two connecting brackets 47 extending in a horizontal direction, into which is welded a spacer sleeve 48. The spacer sleeve 48 is arranged between the two webs 4 of the hollow profiles 12 (FIG. 10) whereupon a bolt is placed through the bores 8. The height of the mounting support is smaller than the distance between the two hollow profiles (FIG. 10) so that in case of a stronger impact the connecting brackets 47 can telescope or slide in between the two hollow profiles 12. The front sides of the hollow profiles 12 are covered by means of elastic protective profiles 49 and 50.

The lateral part 45 (FIG. 8) is constructed as shell open in the direction toward the hollow profiles 12; the lateral part 45 is provided with a recess 51 approximately in its center. Sheet metal disks 52 are welded into the hollow profiles 12 which are provided with rims approximately corresponding to the contour of the recess 51. The sheet metal disks 52 are provided with threaded bushes 53 into which is screwed a bolt 54 (per profile 12) whose head is supported externally at the lateral part 45. The lateral part 45 projects beyond the hollow profile 12 in the forward and rearward direction as well as toward the outside. Its edge is enclosed with an elastic profile strip 55. It possesses an essentially rectangular configuration as viewed in side view which in lieu thereof may also have a configuration indicated in dash line in FIG. 10.

Figure 9:
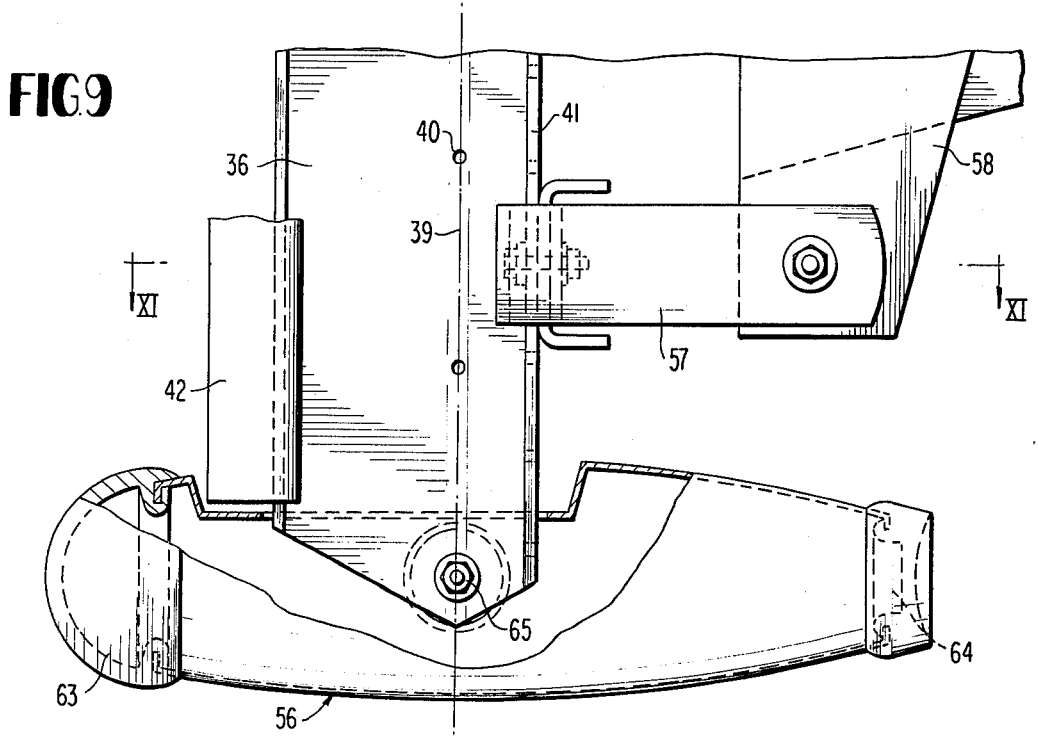
FIG. 9 is a plan view, also partially in cross section on one half of a further embodiment of a symmetrically constructed bumper in accordance with the present invention.
Figure 11:
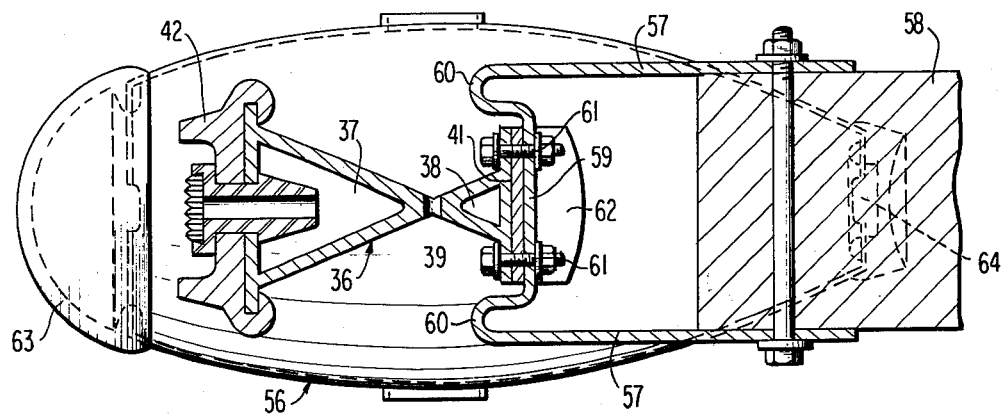
FIG. 11 is a cross-sectional view taken along line XI-XI of FIG. 9.

An embodiment of the present invention is illustrated in FIGS. 9 and 11 in which the center part of the bumper consists of a hollow profile 36 corresponding to FIG. 7 and of a lateral part generally designated by reference numeral 56 constructed as body of revolution. A mounting support is utilized for the mounting of the hollow profile 36 which corresponds essentially to the mounting support illustrated in the embodiment according to FIGS. 8 and 10, whereby, however, two bracket-like parts 57 disposed one above the other are provided which are secured at the support structure 58 by means of preferably only a single bolt. The connecting web 59 between the two bracket-like parts 57 adjoins like the web in the embodiment according to FIGS. 8 and 10 the bracket-like parts 57 by way of deformation folds 60. The rear wall 41 of the rear chamber 38 of the hollow profile 36 is secured at this web 59 by way of an intermediate part 62 whereby two bolts 61 are provided which extend through the apertured rows of the webs 41. An approximately U-shaped reinforcing sheet metal member 62 is arranged between the rear wall of the hollow profile 36 and the web 59. Also in this embodiment the mounting support can deform in case of a stronger impact whereby the hollow profile 36 slides in between the mounting brackets 57 so that no space is required within the area of the support structure for this deformation. The hollow profile 36 is delimited at its outer end by two inclined cuts converging in the web 39 at an obtuse angle (FIG. 9) so that the outermost wall of the lateral part 56 is disposed at a distance to the hollow profile 36. A hemispherically shaped rubber cap 63 is mounted in any conventional manner on the forward end of the lateral part 56, for example, is snapped in. A reflector 64 surrounded with an elastic material is snapped into the rear end of the lateral part 56. The lateral part 56 is provided with an aperture and is placed over the hollow profile 36. It possesses in a manner not illustrated in detail, sheet metal portions provided in a manner corresponding to the X-shaped contour of the hollow profile 36, by means of which it is secured at the apertured row of the web 39 by way of a bolt 65.

FIG. 12 illustrates the manner of mounting a bumper consisting of one or two hollow profiles 28 disposed one above the other and corresponding to FIG. 6, at a support structure 66 of a motor vehicle. The securing takes place in two mounting supports 67 which are constructed in a manner similar to the mounting supports of the embodiment according to FIGS. 8 and 10. In this embodiment of the present invention, lateral parts 68 are constituted from and in one piece with the hollow profiles constituting the center part of the bumper. For that purpose the hollow profile 28 is provided with a cross-sectional reduction within its area projecting beyond the support structure 66 in that the web 31 and the chamber 30 are cut off within this area so that only the forward chamber 29 with the webs 5 and 6 remains. This part is bent off in the direction toward the support structure 66. The web 31 and the chamber 30 can be removed within this area by cutting out or milling out or grinding out or the like.

In general it will be appropriate to provide a center part which extends completely rectilinearly. However, it is also possible without any difficulty to utilize as illustrated, for example, in FIG. 13 a center part that is bent at an obtuse angle in the vehicle center, for which may be utilized, for example, again a profile corresponding to the embodiment according to FIG. 7. This hollow profile 36 is secured at the support structure 58 in the manner already described. Laterally projecting end pieces which extend approximately or exactly flush to the hollow profile 36 serve as lateral parts 69 in this embodiment; the end pieces may be constructed each in one piece. However, it is also possible to utilize two correspondingly shaped half shells. The mounting and fastening takes place either by a direct threaded connection in the apertured row 40 of the web 39 or by clamping whereby a clamping bolt is provided in the lateral part 69 which is preferably provided with a spacer sleeve.

In the embodiment according to FIGS. 14 and 15, a center part is utilized which is curved outwardly and which corresponds, for example, to the hollow profile 17 of FIG. 4. In the embodiment according to FIG. 14, a lateral part 71 adjoins a mounting support 70 engaging laterally at the hollow profile 17; the lateral part 71 consists of rectangular profile whose inner edge is inserted into the hollow chamber of the hollow profile and is centered thereat. The bumper center part as also the two mounting supports 70 and the two lateral parts 71 are held together by means of only four bolts 72 (not illustrated in detail).

In the embodiment according to FIG. 15 the hollow profile 17 is secured at the support structure 75 of a motor vehicle by means of a three-jointed scissor-like member 73. A lateral part 74 is additionally pivotally connected or secured at the scissor-like member 73; the lateral part 74 projects laterally beyond the center part constituted by the hollow profile 17 and is supported with respect to the support structure 75, exactly like the part 17, by elements not illustrated in detail herein and of any conventional construction, for example, by conventional springs, shock absorbers, deformation members and the like.

While I have shown and described several embodiments in accordance with the present invention, it is understood that the same is not limited thereto but is susceptible of numerous changes and modifications as known to those skilled in the art. For example, the present invention is not limited to the details of the illustrated embodiment but also includes all possible combinations of the elements described and illustrated herein. Hence, I do not wish to be limited to the details shown and described herein but intend to cover all such changes and modifications as are encompassed by the scope of the appended claims.

What I claim is:

1. A bumper for motor vehicles, especially for passenger motor vehicles, having a vehicle support structure with a front and rear end, the bumper being disposed beyond the respective ends of the support structure, the bumper comprising: at least one hollow profile member having upper and lower wall portions tapering in the direction of the vehicle support structure, said hollow profile member including a front wall portion having an approximately vertical smooth surface and extending between said upper and lower wall portions, a first web means provided on said profile member for mounting the same on the vehicle support structure, said first web means being disposed in a substantially horizontally extending plane and extending substantially over the entire width of the vehicle, a second web means provided on said front wall portion, said second web means being an extension of said front wall portion and spaced from said first web means in a direction away from the vehicle support structure, at least one protective profile means mounted on said second web means, and lateral parts provided on both lateral edges of said hollow profile member.

2. A bumper according to claim 1, further comprising mounting supports on the vehicle, said first web means being provided with means for connecting the same with said mounting supports.

3. A bumper according to claim 1, wherein said at least one protective profile means is an elastic profile means.

4. A bumper according to claim 1, wherein several elastic protective profile means are provided and mounted on said second web means.

5. A bumper according to claim 1, wherein said hollow profile member includes at least two chambers which are connected with each other by said first web means.

6. A bumper according to claim 1, wherein said second web means are provided with edges, and wherein said edges are bent off.

7. A bumper according to claim 2, wherein said second web means are provided with edges, and wherein said edges are bent off at an angle.

8. A bumper according to claim 1, wherein said hollow profile members are provided with rows of apertures.

9. A bumper according to claim 8, wherein said apertured rows are provided in one of said web means.

10. A bumper according to claim 9, wherein at least one of said apertured rows is provided in said first web means.

11. A bumper according to claim 1, wherein the cross section of said hollow profile member is triangular.

12. A bumper according to claim 1, wherein the cross section of said hollow profile member is trapezoidal.

13. A bumper according to claim 1, wherein said hollow profile member includes two chambers disposed substantially horizontally one behind the other with the apexes thereof directed against one another.

14. A bumper according to claim 1, wherein said hollow profile member consists of an extrusion profile.

15. A bumper according to claim 1, wherein several hollow profile members are arranged one above the other.

16. A bumper according to claim 1, wherein said lateral parts are mounted into the hollow profile means.

17. A bumper according to claim 1, wherein said, lateral parts are constructed as shells.

18. A bumper according to claim 17, wherein said shells are enclosed at the edge thereof with an elastic profile.

19. A bumper according to claim 17, wherein said lateral parts constructed as shells open in the direction toward said hollow profile member.

20. A bumper according to claim 19, wherein said shells are enclosed at the edge thereof with an elastic profile.

21. A bumper according to claim 1, wherein said first web means is clamped in between at least a pair of jaw-like mounting support means.

22. A bumper according to claim 21, wherein a spacer member is provided for connecting said mounting support means.

23. A bumper for motor vehicles, especially for passenger motor vehicles, having a vehicle support structure with a front and rear end, the bumper being disposed beyond the respective ends of the support structure, comprising: at least one hollow profile means having side edges, a first web means provided on said profile means for mounting the same on the vehicle support structure, said first web means extending substantially over the entire width of the vehicle, a second web means provided on said hollow profile means, said second web means being outwardly projecting and spaced from said first web means in a direction away from the vehicle support structure, at least one protective profile means provided on said second web means, lateral parts provided on both side edges of said hollow profile means, said first web means being clamped between at least a pair of jaw-like mounting support means, a spacer member for connecting said mounting support means, said spacer member being tubular, and wherein a single bolt and said tubular spacer member connect said mounting support means.

24. A bumper according to claim 1, wherein several hollow profile members are provided, said profile members being arranged one above the other, and wherein mounting support means are provided including a common bolt means for securing said profile members, said common bolt means having a height which is smaller than the vertical spacing between said several hollow profile members.

25. A bumper for motor vehicles, especially for passenger motor vehicles, having a vehicle support structure with a front and rear end, the bumper being disposed beyond the respective ends of the support structure, comprising: several hollow profile means each having side edges, said profile means being arranged one above the other, a first web means provided on each of said hollow profile means for mounting the same on the vehicle support structure, said first web means extending substantially over the entire width of the vehicle, a second web means provided on each of said hollow profile means, said second web means being outwardly projecting and spaced from said first web means in a direction away from the vehicle support structure, at least one protective profile means mounted on said second web means, lateral parts provided on both side edges of each of said hollow profile means, mounting support means including a common bolt means for securing said profile means, said common bolt means having a height which is smaller than the vertical spacing between said several hollow profile means, said mounting support means further including two brackets-like parts, said bolt means being arranged between said two bracket-like parts, said bracket-like parts including portions diverging in the direction toward the vehicle support structure.

26. A bumper according to claim 1, wherein two protective profile means are provided.

27. A bumper according to claim 26, wherein said two protective profile means consist of upper and lower protective profile means disposed at the respective upper and lower edges of said front wall portion, and wherein said upper and lower protective profile means are constructed as separate structural parts, and a spacer element is provided for connecting said protective profile means.

28. A bumper according to claim 27, wherein said spacer element is provided with edges, said edges being rolled in.

29. A bumper according to claim 27, wherein said spacer element is provided with edges, said edges including a unitary reinforcing rim.

30. A bumper according to claim 27, wherein said spacer element is constructed as decorative part.

31. A bumper according to claim 27, wherein said spacer element consists of transparent material.

32. A bumper according to claim 27, wherein said spacer element carries an inscription.

33. A bumper according to claim 27, wherein said spacer element includes a reflecting surface.

34. A bumper according to claim 27, wherein said spacer element is made from reflecting material.

35. A bumper according to claim 1, wherein said second web means includes a substantially vertical portion, and wherein said protective profile means engage said vertical portion from above and below the same.

36. A bumper according to claim 1, further comprising a profile element inserted into said protective profile means, said profile element serving as a deformation and support element 37. A bumper for motor vehicles, especially for passenger motor vehicles, having a vehicle support structure with a front and rear end, the bumper being disposed beyond the respective ends of the support structure, comprising: at least one hollow profile, means having side edges, a first web means provided on said profile means for mounting the same on the vehicle support structure, said first web means extending substantially over the entire width of the vehicle, a second web means provided on said hollow profile means, said second web means being outwardly projecting and spaced from said first web means in a direction away from the vehicle support structure, at least one protective profile means provided on said second web means, lateral parts provided on both side edges of said hollow profile means, said hollow profile means being provided with upper and lower edges, two protective profile means of elastic material provided within the area of said upper and lower edges, a protective profile means provided at the upper edge and at the lower edge of said hollow profile means, said upper and lower protective profile means provided at the upper edge and lower edge of said hollow profile means being constructed as separate structural parts, and a spacer element for connecting said protective means, said spacer element being constructed as a decorative part and being made from non-corrosive material.

* * * * *